US008718328B1

(12) United States Patent
Gaddy et al.

(10) Patent No.: US 8,718,328 B1
(45) Date of Patent: May 6, 2014

(54) DIGITAL PROCESSING METHOD AND SYSTEM FOR DETERMINATION OF OBJECT OCCLUSION IN AN IMAGE SEQUENCE

(71) Applicant: Spinella IP Holdings, Inc., Colts Neck, NJ (US)

(72) Inventors: William L. Gaddy, Milford, PA (US); Vidhya Seran, Irving, TX (US)

(73) Assignee: Spinella IP Holdings, Inc., Colts Neck, NJ (US)

( * ) Notice: Subject to any disclaimer, the term of this patent is extended or adjusted under 35 U.S.C. 154(b) by 0 days.

(21) Appl. No.: 14/065,704

(22) Filed: Oct. 29, 2013

Related U.S. Application Data

(60) Provisional application No. 61/769,311, filed on Feb. 26, 2013.

(51) Int. Cl.
*G06K 9/00* (2006.01)
*H04N 11/02* (2006.01)

(52) U.S. Cl.
USPC .................. 382/103; 382/291; 375/240.16

(58) Field of Classification Search
CPC ............. G06T 5/001; G06T 7/02; G06T 1/00; H04N 11/02; G06K 9/00
USPC ......... 382/100, 103, 106–107, 154, 162, 168, 382/173, 181, 194, 199, 209, 232, 254–255, 382/274–276, 284–295, 305, 312; 375/240.12, 240.16; 348/441
See application file for complete search history.

(56) References Cited

U.S. PATENT DOCUMENTS

| 6,157,747 | A  | * | 12/2000 | Szeliski et al. ................. 382/284 |
| 7,408,986 | B2 | * | 8/2008  | Winder ..................... 375/240.12 |
| 8,433,156 | B2 | * | 4/2013  | Mishima et al. .............. 382/275 |
| 2009/0161010 | A1 | * | 6/2009 | Tran et al. ..................... 348/441 |
| 2012/0177121 | A1 | * | 7/2012 | Tripathi et al. .......... 375/240.16 |

* cited by examiner

*Primary Examiner* — Seyed Azarian
(74) *Attorney, Agent, or Firm* — Lowenstein Sandler LLP (57) ABSTRACT

A method and system for occlusion region detection and measurement between a pair of images are disclosed. A processing device receives a first image and a second image. The processing device estimates a field of motion vectors between the first image and the second image. The processing device motion compensates the first image toward the second image to obtain a motion-compensated image. The processing device compares a plurality of pixel values of the motion-compensated image to a plurality of pixels of the first image to estimate an error field. The processing device inputs the error field to a weighted error cost function to obtain an initial occlusion map. The processing device regularizes the initial occlusion map to obtain a regularized occlusion map.

20 Claims, 8 Drawing Sheets

DIGITAL PROCESSING METHOD AND SYSTEM FOR DETERMINATION OF OBJECT OCCLUSION IN AN IMAGE SEQUENCE

CROSS-REFERENCE TO RELATED APPLICATIONS

This application claims the benefit of U.S. provisional patent application No. 61/769,311 filed Feb. 26, 2013, the disclosure of which is incorporated herein by reference in its entirety.

TECHNICAL FIELD

The present invention relates generally to digital image processing, and more particularly, to a method and system for automatic determination of the presence, location, and type of occlusion regions between a pair of images.

BACKGROUND

Determining an optical flow or motion vector field between two images, particularly for sequences of video frames and/or fields, is frequently encountered in many high-value video processing tasks such as coding, frame rate conversion, noise reduction, etc. Conventional methods for calculating optical flow encounter several stumbling blocks—many solutions of which are described in U.S. Pat. No. 8,355,534 (hereinafter, "the '534 patent"), incorporated herein by reference in its entirety. As taught in the '534 patent, object occlusion presents a challenge for any motion estimation system, such as an optical flow estimation system.

Figure 1:
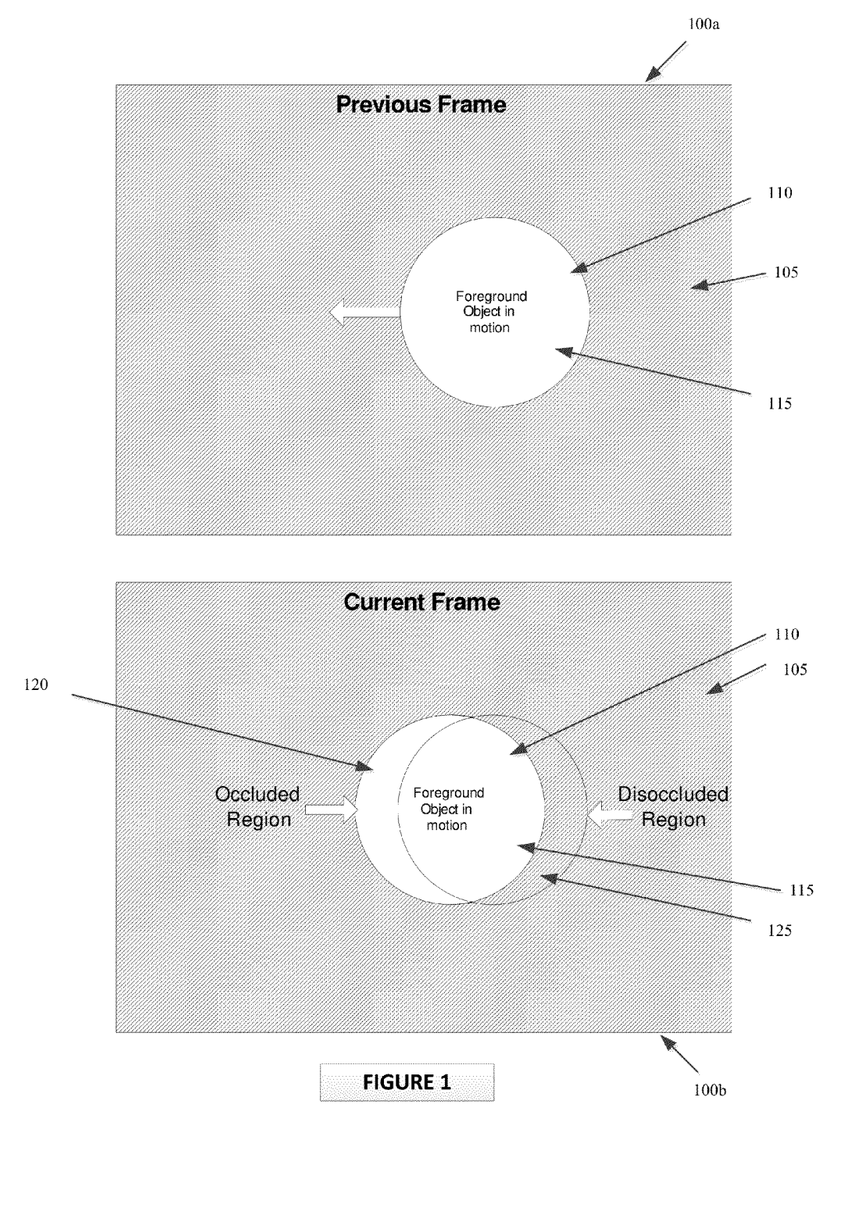
FIG. 1 shows an example of an image pair with background and foreground, where the foreground object is in motion and shows occlusion and disocclusion regions.

FIG. 1 shows an example of an image pair 100a, 100b, with background 105 and foreground 110, where a foreground object 115 is in motion and which shows an occlusion region 120 and a disocclusion region 125. When the foreground object 115 is in motion in a video sequence, background pixels of the image 100b in the forward-motion direction are hidden (known herein as occlusion or the occlusion region 120) while background pixels of the image 100b behind the motion are revealed (known herein as disocclusion or the disocclusion region 125). In the occluded areas of an image, there is no definite motion attributable to the background; concomitantly, there is no definite motion attributable to the foreground object in disoccluded regions of the image. These two types of areas within a pair of images (collectively known herein as occlusion regions) are very problematic for motion estimation in general, and for many optical flow systems in particular, because erroneous motion vector values in these regions tend to propagate into non-occlusion regions, adversely affecting the overall accuracy of the optical flow estimation. Determination of occlusion regions has many benefits for other high-value video analysis tasks in addition to improvement of optical flow and motion estimation, such as disparity and depth estimation, image segmentation, object identification, and 3D conversion and projection.

The detection of occlusion has received much attention in the context of motion estimation, depth estimation and image/video segmentation. Occlusion can be estimated or computed explicitly or implicitly. Occlusion boundaries themselves provide strong cues for 3D scene reconstruction. Methods as described in A. Saxena, M. Sun, and A. Y. Ng, "Make3D: Learning 3D Scene structure form a Single Image," PAMI, 31: 824-840, 2009, and in D. Hoiem, A. A. Efros, and A. Hebert, "Recovering Occlusion Boundaries from an Image," International Journal on Computer Vision, pages 1-19, 2010, propose to find occlusion boundaries using a single frame by over-segmentation and supervised-learning. With no motion information, occlusion boundary detection is an inherently ambiguous problem. Other methods attempt to layer input video into flexible sprites to infer occluded pixels/regions (see e.g., N. Jojic and B. J. Frey, "Learning Flexible Sprites in Video layers," in CVPR, 2001). Layered methods provide realistic modeling of occlusion boundaries, but these methods need to have continuous regions, relative order of surfaces, and predetermined motion. The method described in Sun, D., Sudderth, E. B., Black, M. J., "Layered image motion with explicit occlusions, temporal consistency, and depth ordering," in: Advances in Neural Information Processing Systems, pp. 2226-2234 (2010), explicitly models occlusion and the results obtained are relatively accurate, but the method possesses a huge computational load. Finding occlusion regions represents a common problem in multi-view 3D projection and display methods. The most recent researched methods in this area are still prone to gross errors when the background or foreground underlying pixel data in these regions is homogeneous or have no texture information.

In Alvarez, et al, "Symmetrical dense optical flow estimation with occlusions detection," International Journal of Computer Vision 75(3), 371-385 (2007), (hereinafter, Alvarez), passing interest is focused on the role of the diffusion tensor and subsequent eigenvalue analysis, but this is only used to analyze the forward and backward symmetry of the optical flow solution, and not used to directly improve the accuracy of either the optical flow computation nor the occlusion computation.

Ince, S., Konrad, J., "Occlusion-aware optical flow estimation," IEEE Trans. Image Processing 17(8), 1443-1451 (2008), (hereinafter, "Ince"), discloses a method and systems for joint determination of optical flow and occlusion, but the systems are coupled and this method is not applicable for coupling to a non-optical-flow motion estimation system, such as block matching. Further, Ince ignores the notion of either a diffusion tensor or structure tensor of the images in order to improve robustness.

Motion cues are very important for identifying occlusion regions and boundaries. As described above, the objective of any motion estimation is to compute a flow field that represents the motion of points in two consecutive frames, and the most accurate motion estimation techniques should be able to handle occlusions. Some occlusion detection work based on motion as described in Alvarez and Ince, jointly estimates backward and forward motion and marks inconsistent pixels as occluded regions. In such circumstances, occlusion is detected implicitly and the occlusion detection is coupled with the motion estimation method itself. These methods encounter problems within highly textured imagery areas and do not succeed with large displacements or occlusion regions.

Xiao, et al, "Bilateral Filtering-Based Optical Flow Estimation with Occlusion Detection," Leonardis, A., Bischof, H., Pinz, A. (eds.) ECCV 2006, Part I. LNCS, vol. 3951, pp. 211-224, Springer, Heidelberg (2006) discloses another joint method for computing optical flow and occlusion, but its two computations are closely coupled into a joint regularization framework. Further, this method requires multiple iterations for convergence of the disclosed regularization function and is therefore not suitable for real-time computation for contemporaneous video resolutions such as 1080 and 4K.

Even the best conventional motion estimation methods with coupled occlusion detection systems suffer from two primary disadvantages. First, these methods are too computationally complex for real-time processing. Second, the occlusion region maps they produce are inherently noisy.

Pixels marked as occlusions may frequently be false-positives or false-negatives, rendering their usage in subsequent video processing and analysis tasks challenging or impossible.

Accordingly, there is a need for an accurate, precise, low-computational complexity occlusion estimation system and method that in conjunction with a motion estimation system, increases the robustness and accuracy of such a system in the presence of large motions and resulting large occlusion regions.

BRIEF SUMMARY OF THE INVENTION

The above-described problems are addressed and a technical solution is achieved in the art by providing a method and system for occlusion region detection and measurement between a pair of images. A processing device receives a first image and a second image. The processing device estimates a field of motion vectors between the first image and the second image. The processing device motion compensates the first image toward the second image to obtain a motion-compensated image. The processing device compares a plurality of pixel values of the motion-compensated image to a plurality of pixels of the first image to estimate an error field. The processing device inputs the error field to a weighted error cost function to obtain an initial occlusion map. The processing device regularizes the initial occlusion map to obtain a regularized occlusion map.

In one example, regularizing may further comprise obtaining a regularized error field. In one example, comparing and regularizing may be repeated until a value based on at least one of the regularized occlusion map or the regularized error field is below a threshold value. In one example, motion compensating the first image toward the second image comprises image warping the field of motion vectors from the first image toward the second image. In one example, the initial occlusion map and the regularized occlusion map are each based on a weighted error cost function. The weighted error cost function may be at least one of a sum-of-square differences measure, a locally scaled sum-of-square differences measure, a normalized cross-correlation measure, or a zero-mean normalized cross-correlation measure. The weighted error cost function may be based on a local weighting over a local region of support. In one example, the local weighting over a local region of support may be based on an eigensystem analysis of the local structure tensor of the motion-compensated image. In another example, the local weighting over a local region of support is a gradient-energy weighting over the local region of support. The gradient-energy weighting over a local region of support may be a sum of statistical variance or local contrast over the local region of support.

In one example, regularizing the occlusion map to obtain a regularized occlusion map may comprise applying a multi-sigma regularization to the occlusion map. Applying a multi-sigma regularization to the occlusion map may comprise applying a 4-factor sigma filter to the occlusion map. Input weights for the multi-factor sigma filter may comprise an initial coarse occlusion field estimate and, between the first image and the second image one or more of similarities of color value or luminance, similarities of circular values of motion vector directions, or similarities of motion vector magnitudes. The multi-factor sigma filter may incorporate one or more weights, such as depth, or discontinuities of a range-to-target field.

Examples of the present disclosure provide a method and system for detecting and characterizing occlusion regions without any assumptions that depend on scene types, motion types, or supervised learning datasets. Examples of the present disclosure provide an accurate and precise occlusion region map. The occlusion detection is decoupled from the motion estimation itself, providing for flexible addition to any suitable optical flow or motion estimation system or method.

DETAILED DESCRIPTION

Motion estimation has been extensively explored in the related art and a determination of accurate motion vectors between images is still a challenging problem. Several solutions have historically been used for motion estimation, such as simple block matching, hierarchical block matching, and optical flow estimation. In order to estimate an accurate motion vector field, the occlusion problem needs to be explicitly confronted. Occlusion detection is also very important in estimating a disparity map for stereo matching. Occlusion marking has independent applications beyond motion estimation and disparity map estimation, such as in video surveillance object sorting/object removal and re-projection of multi-view video and imagery. Also, marking occlusions is very useful for image segmentation, motion segmentation, image in-painting, and disparity in-painting.

Occlusion occurs under one of the following conditions: a camera or capture system is zoomed in/out, a new object appears in-frame, or old objects disappear from frame, and moving foreground objects reveal background pixels. For example, in stereoscopic image pairs, two images are captured from different angles and some pixels exist in only one view. As used herein, these pixels are known as occluded pixels. Similarly, in video surveillance, a person moving away from a camera or a new person appearing in front of the camera introduces occlusion.

Figure 2:
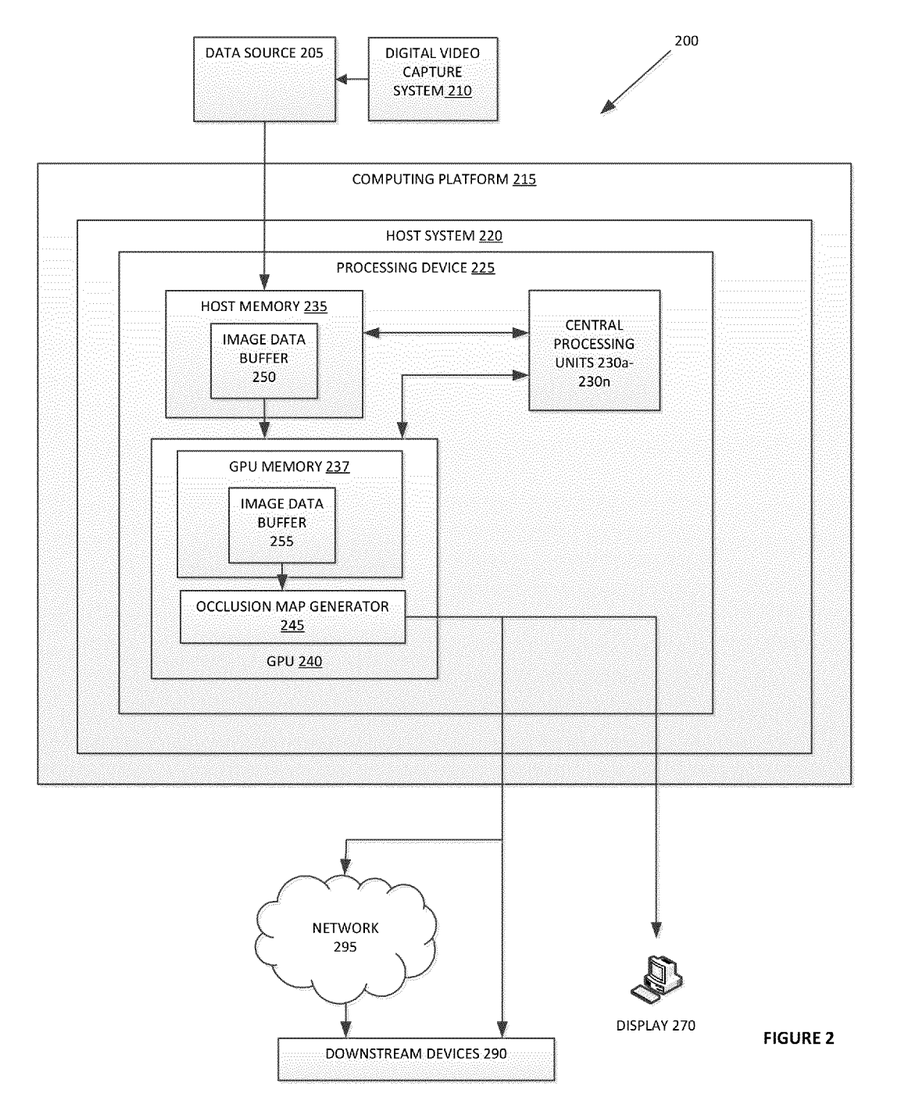
FIG. 2 is a block diagram of an example computing system for detecting one or more occlusion regions in an image sequence, in which examples of the present disclosure may operate.

FIG. 2 is a block diagram of an example computing system 200 for detecting one or more occlusion regions in an image sequence, in which examples of the present disclosure may operate. By way of non-limiting example, the computing system 200 receives data from one or more data sources 205, such as a video camera or a still camera or an on-line storage device or transmission medium. The computing system 200 may also include a digital video capture system 210 and a computing platform 215. The digital video capturing system 210 processes streams of digital video, or converts analog video to digital video, to a form which can be processed by the computing platform 215 as data source 205. The computing platform 215 comprises a host system 220 which may comprise, for example, a processing device 225, such as one or more central processing units 230a-230n. The processing device 225 is coupled to a host memory 235.

The processing device may further implement a graphics processing unit 240 (GPU). It will be appreciated by those skilled in the art that other co-processor architectures may be utilized besides GPUs, such as, but not limited to, DSPs, FPGAs, or ASICs, or adjunct fixed-function features of the processing device 225 itself. It will further be appreciated by those skilled in the art that the GPU 240 may be collocated on the same physical chip or logical device as the central processing units 230a-230n, also known as an "APU", such as found on mobile phones and tablets. Separate GPU and CPU functions may be found on computer server systems where the GPU is a physical expansion card, and personal computer systems and laptops. The GPU 240 may comprise a GPU memory 237. It will be appreciated by those skilled in the art that the host memory 235 and GPU memory 237 may also be collocated on the same physical chip(s) or logical device, such as on an APU.

Figure 3:
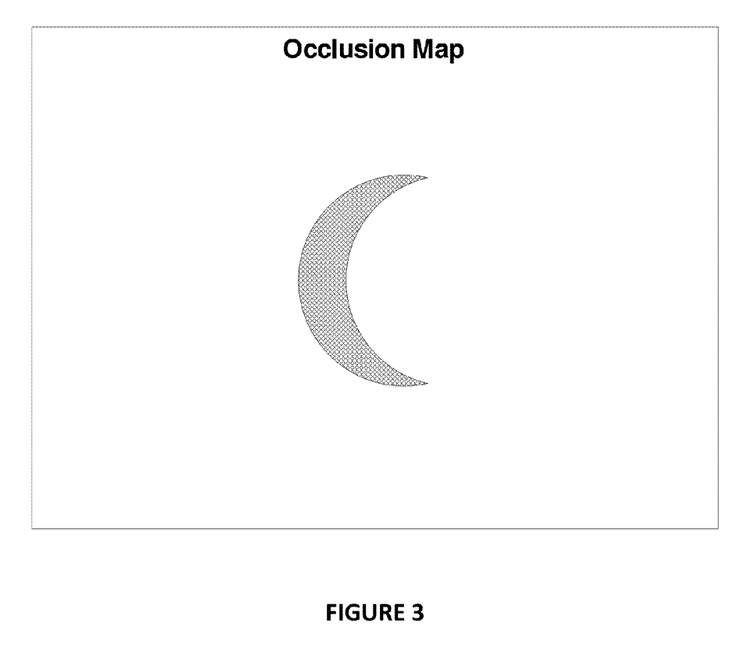
FIG. 3 shows an exemplary occlusion field/map.

The processing device 225 is configured to implement an occlusion map generator 245 for detecting occlusion regions and/or disocclusion regions in a sequence of images. The occlusion map generator 245 may be configured to receive data (e.g., a first image and a second image) from the data source 205, and to receive an image data buffer 250, which is transferred to the GPU memory 237 as image buffer 255. In one example, the processing device 225 may implement the occlusion map generator 245 as a component of the GPU 240. The occlusion map generator 245 is configured to obtain a regularized occlusion map from the image buffer 255 as shown in FIG. 3. As used herein, the totality of occluded regions for a given image is referred to as an occlusion map. In one example, the regularized occlusion map may be displayed on a display 270. In another example, the occlusion map generator 245 may transmit the regularized occlusion map to one or more downstream devices 290 directly or through a network 295.

Figure 4:
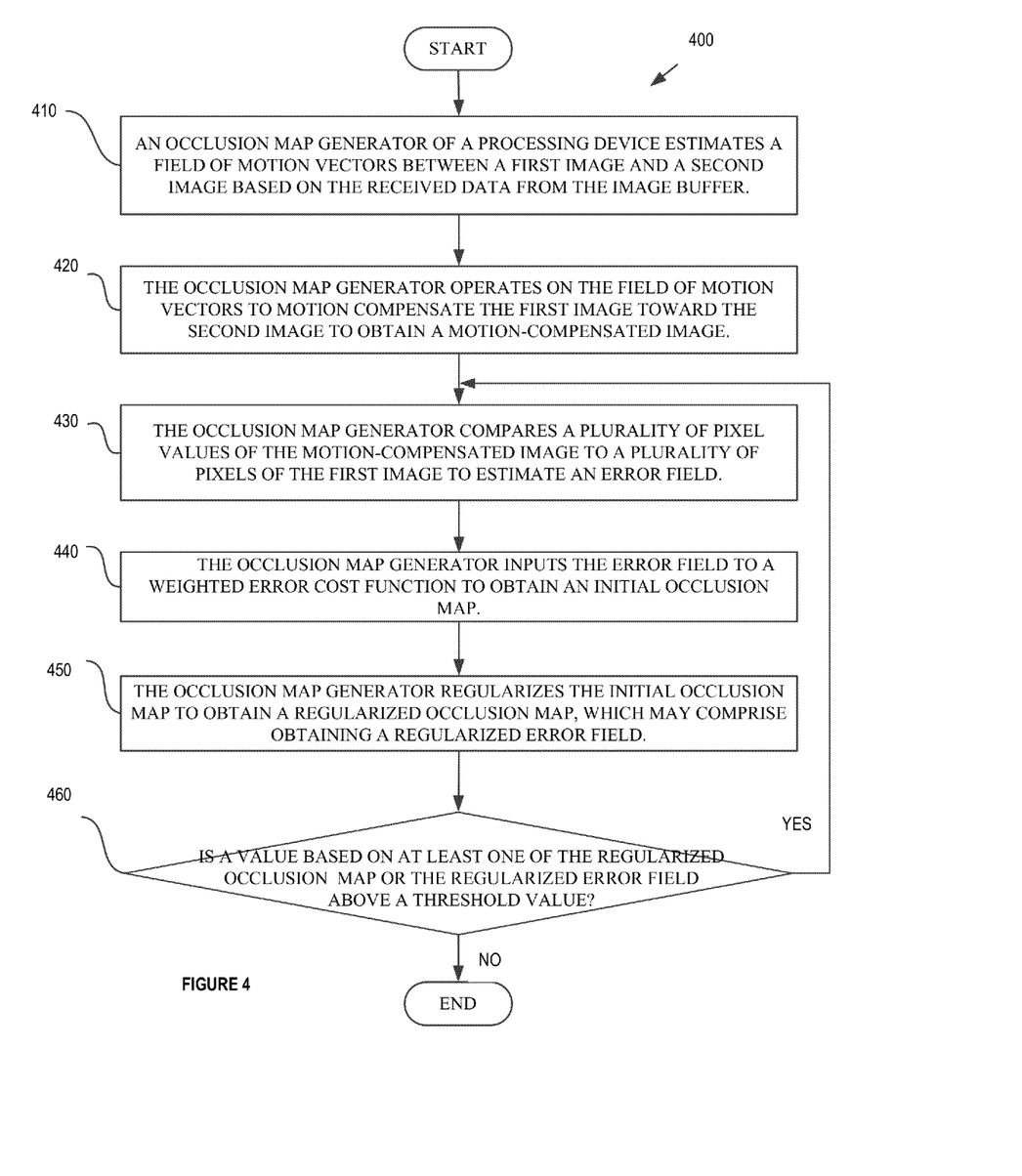
FIG. 4 is a flow diagram illustrating an example of a method for detecting occlusion regions and/or disocclusion regions in a sequence of images using the computing system of FIG. 2.

FIG. 4 is a flow diagram illustrating an example of a method 400 for detecting occlusion regions and/or disocclusion regions in a sequence of images. The method 400 may be performed by a computer system 200 of FIG. 2 and may comprise hardware (e.g., circuitry, dedicated logic, programmable logic, microcode, etc.), software (e.g., instructions run on a processing device), or a combination thereof. In one example, the method 400 is performed by the occlusion map generator 245 of the computing system 200 of FIG. 2.

As shown in FIG. 4, to permit the computing system 200 to generate a regularized occlusion map from a sequence of images, at block 410, the occlusion map generator 245 estimates a field of motion vectors between a first image and a second image based on the received data from the image buffer 255. At block 420, the occlusion map generator 245 operates on the field of motion vectors to motion compensate the first image toward the second image to obtain a motion-compensated image. In one example, when the occlusion map generator 245 motion compensates the first image toward the second image, the occlusion map generator 245 image warps the field of motion vectors from the first image toward the second image.

At block 430, the occlusion map generator 245 compares a plurality of pixel values of the motion-compensated image to a plurality of pixels of the first image to estimate an error field. At block 440, the occlusion map generator 245 inputs the error field to a weighted error cost function to obtain an initial occlusion map. In one example, the weighted error cost function may be at least one of a sum-of-square differences measure, a locally scaled sum-of-square differences measure, a normalized cross-correlation measure, or a zero-mean normalized cross-correlation measure. In one example, the weighted error cost function may be based on a local weighting over a local region of support. The local weighting over a local region of support may be based on an eigensystem analysis of the local structure tensor of the motion-compensated image. In one example, the local weighting over a local region of support may be a gradient-energy weighting over the local region of support. In an example, the gradient-energy weighting over a local region of support may be a sum of statistical variance or local contrast over the local region of support.

At block 450, the occlusion map generator 245 regularizes the initial occlusion map to obtain a regularized occlusion map. In one example, when the occlusion map generator 245 regularizes the initial occlusion map, the occlusion map generator 245 may further regularize the error field.

In one example, regularizing the occlusion map to obtain a regularized occlusion map may comprise applying a multi-sigma regularization to the occlusion map and the error field. In one example, applying a multi-sigma regularization to the occlusion map and error field may comprise applying a 4-factor sigma filter to the occlusion map.

At block 460, if a value based on at least one of the regularized occlusion map or the regularized error field is above a threshold value, the occlusion map generator 245 repeats the comparing and the regularizing steps (i.e., repeating steps 430-460); otherwise, processing terminates.

Let f(x,y,t) be the current frame denotes frame and f(x,y,t−1) be the previous frame. The relationship between f(x,y,t) and f(x,y,t−1) can be denoted as Eq 1:

$$\hat{f}(x, y, t) \approx \begin{cases} W_{t-1=>t}(f(x, y, t-1)) \\ o(x, y, t) \end{cases} \quad \text{Eq. 1}$$

where $W_{t>(t-1)}$ denotes the motion-compensated mapping of frame f(x,y,t−1) to frame f(x,y,t).

Thus the operator gives a per-pixel mapping between two frames and this is applicable to any motion model and estimating disparity map. Equation (1) holds true for everywhere in the video frame except for the occluded regions o(x,y,t−1). The totality of occluded regions for a given image is referred to as the occlusion map. This map represents a gray scale image mask, or alternatively a 2-dimensional matrix of positive values, that in ideal circumstances accurately identifies each pixel as being occluded, where middle range values can either represent variations in confidence, or alternatively degree of transparency of the occluding object(s). In the present disclosure, the problems addressed are of finding the occluded areas in a sequence of images and to perform regularization of the resulting occlusion map to attain temporal stability and to prevent recursive error propagation.

Figure 5:
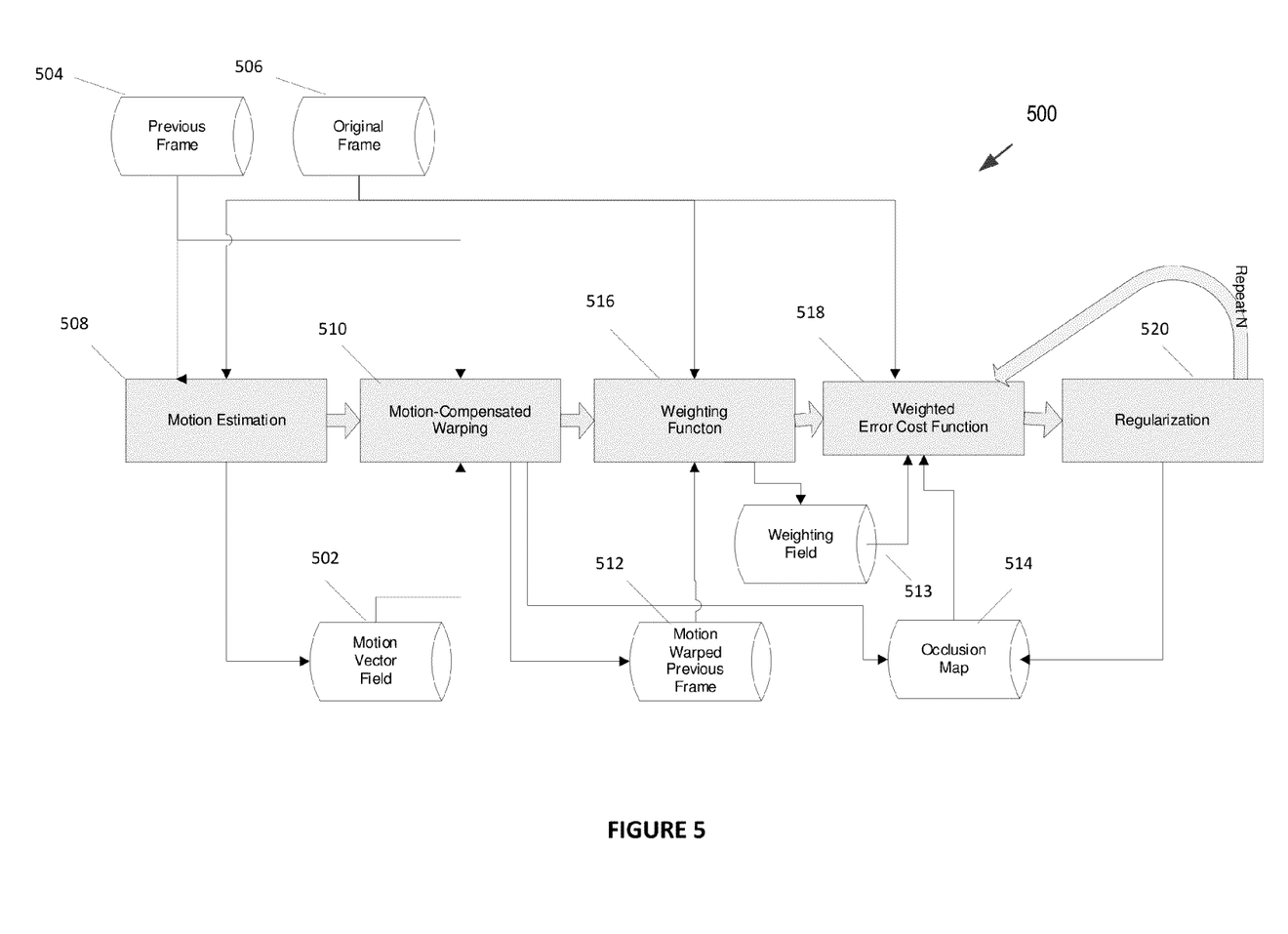
FIG. 5 is a block diagram of an example data flow between modules that implement the method of FIG. 4.

FIG. 5 is a block diagram of one example of data flow through a sequence of modules 500 that comprise the occlusion map generator 245 of FIG. 3. A motion estimation module 508 estimates motion vectors of a motion vector field 502 from a first frame 504 (e.g., a previous frame 504) f(x,y,t−1)

to a second frame 506 (e.g., an original frame 506) frame f(x,y,t). The motion estimation module 508 may implement a motion estimate method which can be, for example, a sub-pixel hierarchical block-based method, optical flow, or recursive disparity estimation for stereoscopic pairs. Based on the motion vectors $mv_u(x,y,t-1)$ and $mv_v(x,y,t-1)$ calculated, a motion compensated warping module 510 may apply a motion compensation warping function $W_{t\rightarrow(t-1)}$ to the motion vector field 502 to obtain a motion warped first frame 512 (e.g., a motion warped previous frame 512). In an example, the function $W_{\rightarrow(t-1)}$ can be expanded as Eq. 2, $$(x+mv_u(x,y,t-1), y+mv_v(x,y,t-1), t) \approx (x,y,t-1) \qquad \text{Eq. 2}$$

It will be appreciated by those skilled in the art that any number of motion compensation regimes may be employed, and the above example is provided for clarity of explanation. The occluded regions will not have true motion vectors since no information was available for the motion estimation system. An ideal motion estimation system may populate these areas with zero magnitude motion vectors or at least signal a lack of confidence in their accuracy by an out-of-band method such as by communicating a confidence map.

It is important to distinguish the warping method described with typical motion compensation regimes. In most motion compensation systems, a "gather" method is applied, such that:

$$(x,y,t) \approx (x+mv_u(x,y,t-1), y+mv_v(x,y,t-1), t-1) \qquad \text{Eq. 3}$$

While the regime as in Eq. 3 ensures that every destination pixel in the compensation will be visited, ensuring a dense image, it also ignores occlusion. By comparison, the warping method of Eq. 2 can be described as a "scatter" method whereby every pixel of the compensated image is not guaranteed to be visited, or filled in. By pre-filling the compensated image buffer with a signal value, unvisited regions in the scatter-based warping operation are left with this signal value undisturbed. This, in turn, forms the starting point of the occlusion map 514.

Next, since the second or original (true) f(x,y,t) frame 506 is known, a weighting function block 516 may apply a weighting function to the motion warped first (e.g., previous) frame 512 to obtain an weighting field 513 which informs subsequent processing steps of the weight to be applied to error cost function analysis for each pixel. In an example, the weighting field 513 may be stored in a separate data buffer or in the alpha channel or fourth channel of the motion warped first (e.g., previous) frame 512. The weighting function may comprise a simple identity function, or something more complex such as Eigensystem analysis of the local structure tensor.

A weighted error cost function block 518 may apply a weighted error cost function using the weights supplied by the weighting field 513. Error pixels from the motion warped first (e.g., previous) frame 512 can be calculated from the weighted error cost function and thereby the occluded areas can be further marked while avoiding the areas already marked.

Nevertheless, special consideration is needed when choosing error cost functions to estimate error, since simple per-pixel differences (known commonly as Sum-of-Absolute-Differences) or un-weighted sum of squared differences may mark false negatives for homogenous regions and objects with low texture and false positives in image regions with strong contrast and edges. The following correlation based similarity measures (see e.g., Nuno Roma, José Santos-Victor, José Tomé, "A Comparative Analysis Of Cross-Correlation Matching Algorithms Using a Pyramidal Resolution Approach," 2002) for estimating the error pixels for each pixel in a frame are instructive for the purpose of the preferred embodiment, but are not a limiting example:

Sum of Squared Differences (SSD), $$e(x, y, t) = \sum_{(i,j) \in R} \left( I(i, j, t) - \hat{I}(x+i, y+j, t) \right)^2 \qquad \text{Eq. 4}$$

Locally scaled Sum of Squared Differences (LSSD), $$e(x, y, t) = \sum_{(i,j) \in R} \left| I(i, j, t) - \frac{\overline{I(i, j, t)}}{\overline{\hat{I}(x, y, t)}} \hat{I}(x+i, y+j, t) \right| \qquad \text{Eq. 5}$$

Normalized Cross Correlation (NCC), and $$e(x, y, t) = \frac{\sum_{(i,j) \in R} \left( I(i, j, t) - \hat{I}(x+i, y+j, t) \right)^2}{\sqrt{\sum_{(i,j) \in R} (I(i, j, t))^2 \cdot \sum_{(i,j) \in R} (I(x+i, y+j, t))^2}} \qquad \text{Eq. 6}$$

Zero-Mean Normalized Cross Correlation (ZNCC):

$$e(x, y, t) = \frac{\sum_{(i,j) \in R} \left( I(i, j, t) - \bar{I} \right) \cdot \left( \hat{I}(x+i, y+j, t) - \bar{\hat{I}} \right)}{\sqrt{\sum_{(i,j) \in R} (I(i, j, t) - \bar{I})^2 \cdot \sum_{(i,j) \in R} \left( I(x+i, y+j, t) - \bar{I} \right)^2}} \qquad \text{Eq. 7}$$

For the equations (4)-(7) shown above, R is the region of support considered for correlation matching and selecting R as 3×3 pixels may be suitable for real-time processing, and 5×5 may be suitable for offline processing. It will be appreciated by those skilled in the art that, over time, larger regions of support may be employed for real-time and offline processing as the underlying system speed and complexity increases. The 3×3 and 5×5 regions-of-support may be provided as examples.

Correlation based matching metrics are very computationally expensive, but since motion vectors are already estimated from an external system, the difference metric can be estimated for a smaller region and does not require a search in a larger pixel region of support.

In addition to the numerical methods for determining local weighting such as global and local mean as disclosed in Eq. 4-7 above, an eigensystem analysis can be utilized to provide a more precise and accurate weighting. The methods described in U.S. Pat. No. 8,355,534, incorporated herein by reference, are particularly instructive, but of particular note here is the use of eigenvalues of the gradient structure tensor of the local region of support to determine whether the region is an isotropic, homogeneous region, one containing significant image texture, or one containing a strong contrast edge. Homogeneous and isotropic region image differences would be weighted less, than for example, those in a highly textured region, based upon such a tensor analysis.

Optical flow motion vectors and disparity maps commonly use regularization and smoothing steps to smooth discontinuities and outliers and further helps to stabilize the motion vector fields along the temporal axis in case of video. It is noted that occlusion and error fields benefit from separate treatment in the same way with a regularization module 520, apart from the motion vector field and the image field.

Figure 6:
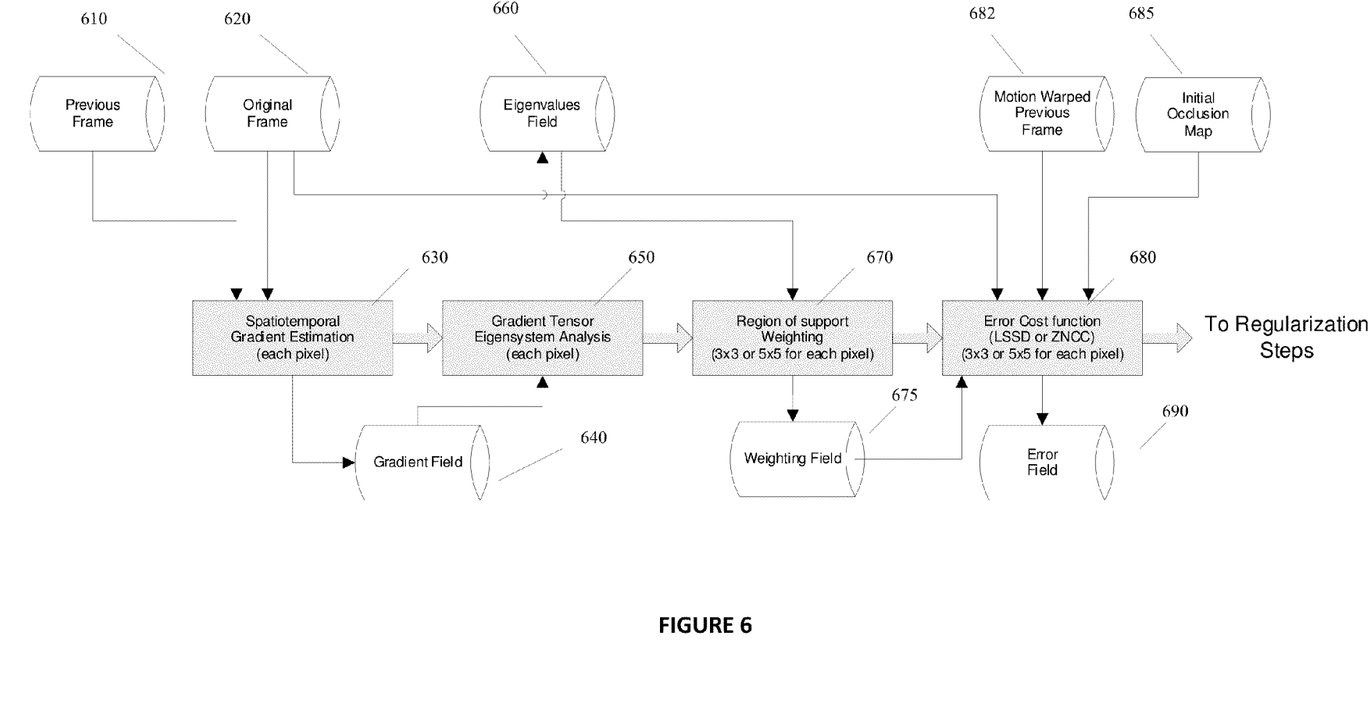
FIG. 6 is a block diagram of an example data flow between modules that implement a weighted distance field module of FIG. 5.

To address the problems of noise, false-positives, and false negatives of the prior art in the final resulting occlusion map 514, weighting function 516 and weighted error cost function 518 may include an eigensystem analysis as depicted in FIG. 6. First, a spatio-temporal gradient estimation 630 may be applied to the field of pixels for the previous frame 610 and the current frame 620 as taught in the '534 patent, which results in a two-dimensional gradient field 640, wherein gradient derivatives may be estimated, for example, in Eq. 9:

$$\sigma_{xx} = \sum_{n=-1}^{n=1} \sum_{m=-1}^{m=1} \frac{\partial D_{RGB}(n,m)}{\partial x} \cdot \frac{\partial D_{RGB}(n,m)}{\partial x} \cdot \text{weight}(n,m)$$

$$\sigma_{xy} = \sum_{n=-1}^{n=1} \sum_{m=-1}^{m=1} \frac{\partial D_{RGB}(n,m)}{\partial x} \cdot \frac{\partial D_{RGB}(n,m)}{\partial y} \cdot \text{weight}(n,m)$$

$$\sigma_{yy} = \sum_{n=-1}^{n=1} \sum_{m=-1}^{m=1} \frac{\partial D_{RGB}(n,m)}{\partial y} \cdot \frac{\partial D_{RGB}(n,m)}{\partial y} \cdot \text{weight}(n,m)$$

$$\sigma_{xt} = \sum_{n=-1}^{n=1} \sum_{m=-1}^{m=1} \frac{\partial D_{RGB}(n,m)}{\partial x} \cdot \frac{\partial D_{RGB}(n,m)}{\partial x \partial t} \cdot \text{weight}(n,m)$$

$$\sigma_{yt} = \sum_{n=-1}^{n=1} \sum_{m=-1}^{m=1} \frac{\partial D_{RGB}(n,m)}{\partial y} \cdot \frac{\partial D_{RGB}(n,m)}{\partial y \partial t} \cdot \text{weight}(n,m)$$

The gradient field 640 is input into a gradient tensor analysis 650, where the gradient values are input to a tensor, and the tensor is subjected to eigensystem analysis as in Eq 10:

$$\text{2D\_tensor} = \begin{vmatrix} \sigma_{xx} & \sigma_{xy} \\ \sigma_{xy} & \sigma_{yy} \end{vmatrix}$$

The eigensystem analysis of Eq. 10 results in two Eigenvalues $\lambda_1$ and $\lambda_2$ for each and every pixel, where the combination of each eigenvalue identifies the local structure of the image surrounding any aforesaid pixel.

The Eigenvalues obtained from gradient tensor analysis 650 result in Eigenvalues fields 660, which identify the Eigenvalues of the local structure tensor for each pixel of the input images 610 and 620. The two Eigenvalues $\lambda_1$ and $\lambda_2$ for each and every pixel may influence the weighting function 670 by discounting the error values in regions with high homogeneity (e.g. low $\lambda_1$ and $\lambda_2$) and low edge dominance (e.g. low $\lambda_1$ relative to $\lambda_2$).

After computing a weighting field 675 as in region of support weighting 670, the weighted error cost function 680 computes a weighted error field 690 as described in the weighting function block 516 of FIG. 5.

Figure 7:
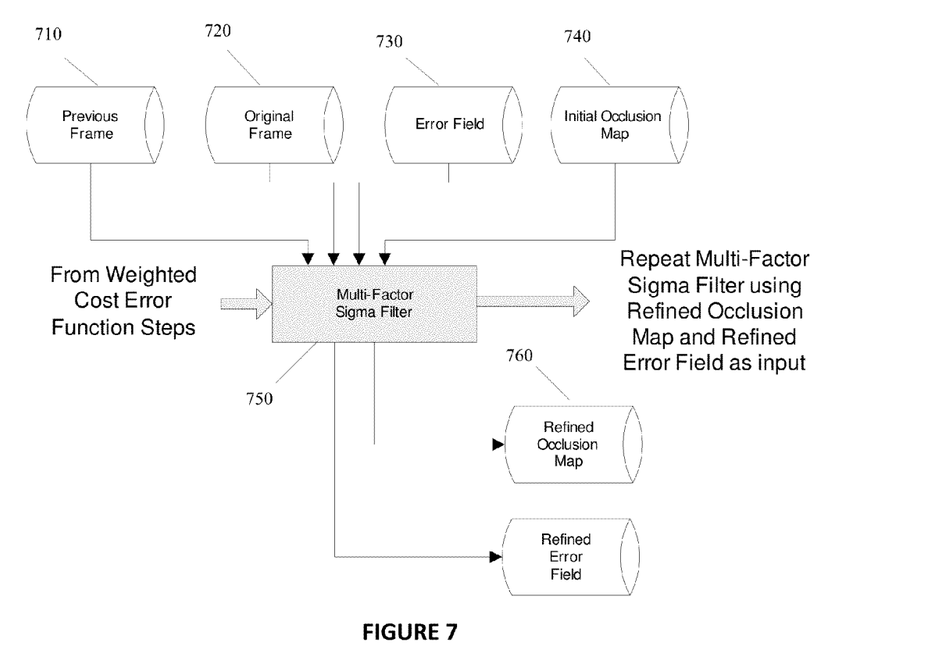
FIG. 7 is a block diagram of an example data flow through a 4-factor sigma filter employed in a regularization module of FIG. 5.

Referring to FIG. 7, the previous frame 710, current frame 720, the resulting error field 730, and the initial occlusion map 740 may be input to a multi-factor sigma filter 750 that operates on the initial occlusion map and field 730 and 740 (similar to the well-known two-factor Bilateral Filter as taught in Tomasi et al, "Bilateral filtering for gray and color images," International Conference on Computer Vision, (1998) pp 839-846), but which may include four or more sigmas (factors): an image color distance function (RGB/YUV) based upon the previous frame 710, current frame 720, a directional distance function for 2D motion vectors based on the weighted distance field 730, a magnitude distance function for 2D motion vectors based on the weighted distance field 730, and occlusion as initially marked in initial occlusion map 740.

The multi-factor sigma filter 750 may be implemented such that when spatial smoothing is applied, if a pixel location is marked as occluded, its contribution to the filter bank coefficients may be penalized heavily, which in turn avoids any unwanted distortions at the object boundaries. Additionally, difference data from dissimilar motion regions by virtue of their associated motion vector directions or magnitudes may be penalized if they are not similar. The multi-factor-sigma filter 750 differs from the bilateral filters and their derivatives in many ways, since the original proposed filter used only two parameters: spatial radius and image color difference. In one example, a multi-factor sigma filter 750 can be represented in equation form as in Eq 11:

$$e'(x,y,t) = \frac{\sum_{(i,j)\in\Omega} g(i-x, j-y, t) r(I(i,j,t) - I(x,y,t)) d(mv_u(i,j,t) - mv_u(x,y,t)) D(mv_v(i,j,t) - mv_v(x,y,t)) o(i,j,t) e(x,y,t)}{\sum_{(i,j)\in\Omega} g(i-x, j-y, t) r(I(i,j,t) - I(x,y,t)) d(mv_u(i,j,t) - mv_u(x,y,t)) D(mv_v(i,j,t) - mv_v(x,y,t)) o(i,j,t)}$$

where e( ) is the error field 690 for the image, o( ) represents the initial occlusion field 685 provided by the warping compensation 510, and e'( ) is the resultant regularized occlusion map 760; and where g( ) is the Guassian spatial distance function, as in Eq 12:

$$g(i-x, j-y, t) = e^{-0.5\left(\frac{(i-x)^2 + (j-y)^2}{\sigma_s}\right)}$$

where r( ) of Eq. 11 is the radiosity function, which observes color differences and/or luminance values, and r( ) of Eq. 12 is a suitable color difference function based on the RGB or YUV values present in an image I, as in Eq 13:

$$r(I(i,j,t) - I(x,y,t)) = e^{-0.5\left(\frac{(fC(I(i,j,t)) - fC(I(x,y,t)))^2}{\sigma_i}\right)}$$

Where fC( ) of Eq 13. may transform the RGB or YUV values to an HSV colorspace representation in one example, as in Eq 14-19:

$$\text{max}RGB = \max(R, G, B)$$

$$\text{min}RGB = \min(R, G, B)$$

$$chroma = \text{max}RGB - \text{min}RGB$$

$$H() = \begin{cases} NaN, & \text{if } chroma = 0 \\ \frac{(G-B)}{chroma} \bmod 6, & \text{if } \text{max}RGB = R \\ \frac{(B-R)}{chroma} + 2, & \text{if } \text{max}RGB = G \\ \frac{(R-G)}{chroma} + 4, & \text{if } \text{max}RGB = B \end{cases}$$

$$V() = chroma$$

-continued $$S() = \begin{cases} 0, & \text{if } chroma = 0 \\ \dfrac{chroma}{V}, & \text{otherwise} \end{cases}$$

and, where function fC( ) measures the color similarity in HSV color space, in one example as in Eq 20:

$$fC(\ ) = a\left[\frac{\text{atan2}(H(i, j, t), H(x, y, t)) + \pi}{2\pi}\right] +$$
$$b(S(i, j, t) - S(x, y, y)) + c(V(i, j, t) - V(x, y, t))$$

where a, b and c are user supplied weighting values, which by way of a non-limiting example may be 0.5, 0.5 and 1.0, respectively; and, where function d( ) of Eq. 11 measures the motion vector similarity, which may include for example: a simple magnitude difference measurement function as in Eq 21:

$$d(mv_u(i, j, t) - mv_u(x, y, t)) = e^{-0.5\left(\frac{(mv_u(i,j,t) - mv_u(x,y,t))^2}{\sigma_u}\right)}$$

where d( ) is a function to measure simple Euclidian distance between motion vectors and where D( ) is a function as in Eq 22-25, whereby a method to independently evaluate motion vector direction similarities is provided:

$$\theta_1 = (x, y, t) = \frac{\text{atan2}(mv(x, y, t)_x, mv(x, y, t)_y) + \pi}{2\pi}$$

$$\theta_2(x, y, t) = \frac{\text{atan2}(mv(x, y, t-1)_x, mv(x, y, t-1)_y) + \pi}{2\pi}$$

As a measure of the directional difference between motion vectors from frame-to-frame, motion vectors that point opposite to each other (180 degrees opposed) are considered most different, as in Eq. 24. Two such vectors would have differences in direction (theta) and magnitude (distance, or D):

$$\Delta\theta(x,y,t) = \min[\text{abs}(\theta_2 - \theta_1), \text{abs}(\theta_2 - 1.0 - \theta_1), \text{abs}(\theta_2 + 1.0 - \theta_1)]$$

Further, to numerically emphasize the motion vectors' angular differences, the difference of angles is transformed to a logarithmic scale. If motion vectors for a particular spatial location change direction by a great amount, their difference D( ) is computed on a logarithmic weighting scale as in Eq 25:

$$D(x,y,t) = \Delta\theta_{log}(x,y,t) = 1.442695 \log(1.0 + 2.0 \times \Delta\theta)$$

Then, the magnitude differences d( ) of Eq. 21 of the respective optical flow vectors for each spatial location are transformed to a logarithmic scale. This emphasizes large differences as opposed to small ones. In one example, values for these are as computed as in Eq 26:

$$d(x, y, t) = \log\left\{1.0 + 4.0 \times \max\left[\frac{\sqrt{mv(x, y, t)_x^2 + mv(x, y, t)_y^2}}{\sqrt{mv(x, y, t-1)_x^2 + mv(x, y, t-1)_y^2}}\right]\right\}$$

The regularization of the output occlusion field values o( ) and error field values e'( ) of Eq. 11 is not just using the radius considered, but also includes the difference in motion vectors, the image luminance and the occlusion markings. This excludes the occluded areas from the operation and will not introduce any distortions due to imperfect motion estimation vectors.

In turn, the error field is now well-conditioned for a simple, consistent thresholding operation, whereby occlusion field pixels corresponding to error field values below a given threshold are marked as non-occlusion in the final occlusion map O( ), while those greater are marked affirmatively as occlusions in the final occlusion map O( ). A non-limiting example is provided in Eq 27:

$$O(x, y, t) = \begin{cases} 0 & \text{if } e(x, y, t) > \text{threshold} \\ 1 & \text{if } e(x, y, t) \leq \text{threshold} \end{cases}$$

wherein computation of function O( ) results in the final refined occlusion map, as shown in FIG. 5, where typical thresholds range from 0.003 to 0.006, by way of a non-limiting example.

Figure 8:
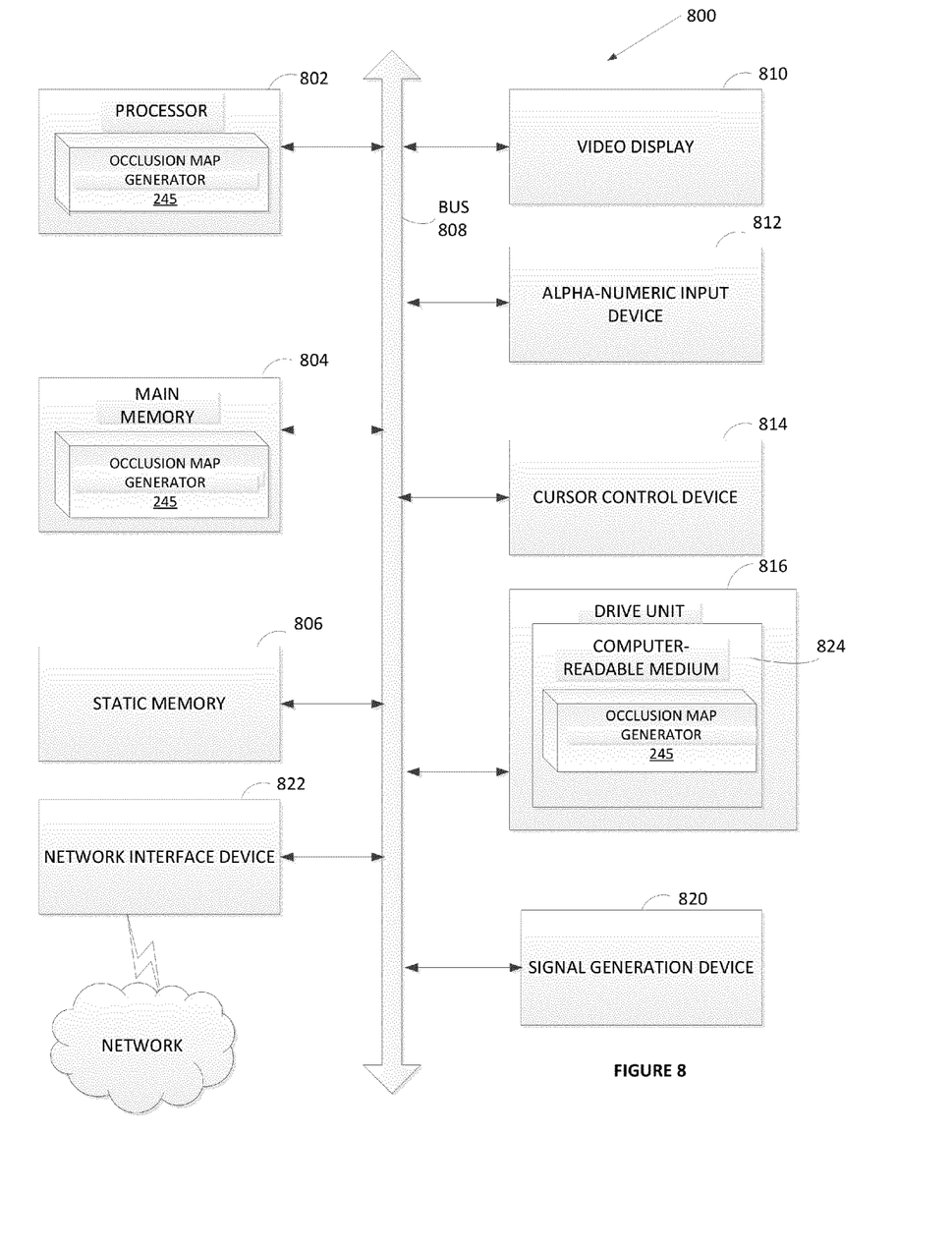
FIG. 8 illustrates a diagrammatic representation of a machine in the example form of a computer system within which a set of instructions, for causing the machine to perform any one or more of the methodologies discussed herein, may be executed.

FIG. 8 illustrates a diagrammatic representation of a machine in the example form of a computer system 800 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The occlusion map generator 245 shown in FIG. 2 may be executed by processor 802 configured to perform the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

A drive unit 816 may include a computer-readable medium 824 on which is stored one or more sets of instructions (e.g., instructions of the occlusion map generator 245) embodying any one or more of the methodologies or functions described herein. The instructions of the occlusion map generator 245 may also reside, completely or at least partially, within the main memory 804 and/or within the processor 802 during execution thereof by the computer system 800, the main memory 804 and the processor 802 also constituting computer-readable media. The instructions of the occlusion map generator 245 may further be transmitted or received over a network via the network interface device 822.

While the computer-readable storage medium 824 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. The high-throughput system and method as disclosed herein that improves the perceptual quality and/or the transmission or storage efficiency of existing image and video compression or transmission systems and methods solves problems in many fields, such as real-time efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core as but a few examples.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method for occlusion region detection, comprising:
receiving, at a processing device, a first image and a second image;
estimating, using the processing device, a field of motion vectors between the first image and the second image;
motion compensating, using the processing device, the first image toward the second image to obtain a motion-compensated image;
comparing, using the processing device, a plurality of pixel values of the motion-compensated image to a plurality of pixels of the first image to estimate an error field;
inputting, using the processing device, the error field to a weighted error cost function to obtain an initial occlusion map; and
regularizing, using the processing device, the initial occlusion map to obtain a regularized occlusion map,
wherein the initial occlusion map and the regularized occlusion map are each based on a weighted error cost function and
wherein the weighted error cost function is at least one of a sum-of-square differences measure, a locally scaled sum-of-square differences measure, a normalized cross-correlation measure, or a zero-mean normalized cross-correlation measure.

2. The method of claim 1, wherein regularizing further comprises obtaining a regularized error field.

3. The method of claim 2, further comprising repeating said comparing and said regularizing until a value based on at least one of the regularized occlusion map or the regularized error field is below a threshold value.

4. The method of claim 1, wherein motion compensating the first image toward the second image comprises image warping the field of motion vectors from the first image toward the second image.

5. The method of claim 1, wherein the weighted error cost function is based on a local weighting over a local region of support.

6. The method of claim 5, wherein the local weighting over a local region of support is based on an eigensystem analysis of the local structure tensor of the motion-compensated image.

7. The method of claim 5, wherein the local weighting over a local region of support is a gradient-energy weighting over the local region of support.

8. The method of claim 7, wherein the gradient-energy weighting over a local region of support is a sum of statistical variance or local contrast over the local region of support.

9. A method for occlusion region detection, comprising:
receiving, at a processing device, a first image and a second image;
estimating, using the processing device, a field of motion vectors between the first image and the second image;
motion compensating, using the processing device, the first image toward the second image to obtain a motion-compensated image;
comparing, using the processing device, a plurality of pixel values of the motion-compensated image to a plurality of pixels of the first image to estimate an error field;
inputting, using the processing device, the error field to a weighted error cost function to obtain an initial occlusion map; and
regularizing, using the processing device, the initial occlusion map to obtain a regularized occlusion map,
wherein regularizing the initial occlusion map to obtain a regularized occlusion map comprises applying a 4-factor sigma filter to the initial occlusion map.

10. The method of claim 9, wherein input weights for the multi-factor sigma filter comprise an initial coarse occlusion field estimate and, between the first image and the second image one or more of similarities of color value or luminance, similarities of circular values of motion vector directions, or similarities of motion vector magnitudes.

11. The method of claim 10, wherein the multi-factor sigma filter incorporates one or more weights, such as depth, or discontinuities of a range-to-target field.

12. A system, comprising:
a memory;
a processing device coupled to and having use of the memory, the processing device to:
receive a first image and a second image;
estimate a field of motion vectors between the first image and the second image;
motion compensate the first image toward the second image to obtain a motion-compensated image;
compare a plurality of pixel values of the motion-compensated image to a plurality of pixels of the first image to estimate an error field;
input the error field to a weighted error cost function to obtain an initial occlusion map; and
regularize the initial occlusion map to obtain a regularized occlusion map,
wherein regularizing the initial occlusion map to obtain a regularized occlusion map comprises applying a 4-factor sigma filter to the initial occlusion map.

13. The system of claim 12, wherein regularizing further comprises obtaining a regularized error field.

14. The system of claim 13, further comprising repeating said comparing and said regularizing until a value based on at least one of the regularized occlusion map or the regularized error field is below a threshold value.

15. A non-transitory computer-readable storage medium including instructions that, when accessed by a processing device, cause the processing device to perform operations comprising:
receiving a first image and a second image;
estimating a field of motion vectors between the first image and the second image;
motion compensating the first image toward the second image to obtain a motion-compensated image;
comparing a plurality of pixel values of the motion-compensated image to a plurality of pixels of the first image to estimate an error field;
inputting the error field to a weighted error cost function to obtain an initial occlusion map; and
regularizing the initial occlusion map to obtain a regularized occlusion map,
wherein regularizing the initial occlusion map to obtain a regularized occlusion map comprises applying a 4-factor sigma filter to the initial occlusion map.

16. The non-transitory computer-readable storage medium of claim 15, wherein regularizing further comprises obtaining a regularized error field.

17. The non-transitory computer-readable storage medium of claim 16, further comprising repeating said comparing and said regularizing until a value based on at least one of the regularized occlusion map or the regularized error field is below a threshold value.

18. The non-transitory computer-readable storage medium of claim 15, wherein the initial occlusion map and the regularized occlusion map are each based on a weighted error cost function.

19. The non-transitory computer-readable storage medium of claim 18, wherein the weighted error cost function is based on a local weighting over a local region of support.

20. The non-transitory computer-readable storage medium of claim 19, wherein the local weighting over a local region of support is based on an eigensystem analysis of the local structure tensor of the motion-compensated image.

* * * * *